United States Patent
Hakhinian

(10) Patent No.: US 10,546,142 B2
(45) Date of Patent: Jan. 28, 2020

(54) SYSTEMS AND METHODS FOR ZERO-KNOWLEDGE ENTERPRISE COLLABORATION

(71) Applicant: Intralinks, Inc., New York, NY (US)

(72) Inventor: Mushegh Hakhinian, Westwood, MA (US)

(73) Assignee: Intralinks, Inc., New York, NY (US)

( * ) Notice: Subject to any disclaimer, the term of this patent is extended or adjusted under 35 U.S.C. 154(b) by 170 days.

(21) Appl. No.: 15/684,027

(22) Filed: Aug. 23, 2017

(65) Prior Publication Data

US 2018/0060597 A1   Mar. 1, 2018

Related U.S. Application Data

(60) Provisional application No. 62/378,290, filed on Aug. 23, 2016.

(51) Int. Cl.
*G06F 21/00* (2013.01)
*G06F 21/62* (2013.01)

(52) U.S. Cl.
CPC .. *G06F 21/6209* (2013.01); *G06F 2221/2107* (2013.01)

(58) Field of Classification Search
CPC ............ G06F 21/6209; G06F 2221/2107
See application file for complete search history.

(56) References Cited

U.S. PATENT DOCUMENTS

| 6,249,866 | B1* | 6/2001 | Brundrett | G06F 12/1408 380/286 |
| 9,203,815 | B1* | 12/2015 | Bogorad | G06F 21/604 |
| 9,258,122 | B1* | 2/2016 | Zhang | H04L 9/14 |
| 2007/0214369 | A1* | 9/2007 | Roberts | G06F 21/79 713/192 |
| 2009/0210721 | A1* | 8/2009 | Phillips | G06F 21/6218 713/182 |
| 2010/0211802 | A1* | 8/2010 | Humphries | G06F 21/78 713/193 |
| 2012/0297189 | A1* | 11/2012 | Hayton | H04L 9/0822 713/165 |

(Continued)

OTHER PUBLICATIONS

Yassin et al., "A Practical Privacy-preserving Password Authentication Scheme for Cloud Computing", 2012 IEEE 26th International Parallel and Distributed Processing Symposium Workshops & PhD Forum, Date of Conference: May 21-25 (Year: 2012).*

(Continued)

*Primary Examiner* — Morshed Mehedi
(74) *Attorney, Agent, or Firm* — Moser Taboada

(57) ABSTRACT

Systems and methods for zero-knowledge enterprise collaboration are provided herein. In some embodiments, the method may comprise receiving, at a host server, a request to store a file, wherein the file is encrypted with a data key prior to being received at the host server; receiving a request to perform a first service; determining whether the first service is authorized to access the file, wherein determining comprises unwrapping the data key with the private key of the first service; providing access to the first service when the private key of the first service successfully unwraps the data key for the file; and storing the encrypted file.

8 Claims, 6 Drawing Sheets

(56) References Cited

U.S. PATENT DOCUMENTS

2015/0154418 A1* 6/2015 Redberg ............... G06F 21/602
713/165
2016/0253515 A1* 9/2016 Damgard ............... H04L 9/085
713/165

OTHER PUBLICATIONS

Turan et al., "Recommendation for Password-Based Key Derivation Part 1: Storage Applications", NIST Special Publication 800-132, Dec. (Year: 2010).*

* cited by examiner

US 10,546,142 B2

SYSTEMS AND METHODS FOR ZERO-KNOWLEDGE ENTERPRISE COLLABORATION

CROSS REFERENCE TO RELATED APPLICATIONS

This application claims benefit of U.S. Provisional Application Ser. No. 62/378,290, filed Aug. 23, 2016, which is herein incorporated by reference in its entirety.

BACKGROUND OF THE INVENTION

Field of the Invention

Embodiments of the present invention relate generally to sharing secured content and, more particularly, to methods and systems for system-to-system zero-knowledge enterprise collaboration.

Description of the Related Art

Despite the availability of the Internet, there is still no entirely satisfactory way for people at different companies or other entities to have the benefits of private network security, such as for collaborative work between enterprises on a daily basis and for ad hoc alliances, i.e., different sets of entities coming together to function as one mega or meta entity, for the duration of some particular project. In such cases, the time and expense of actually wiring a network between two or more companies or other entities and agreeing on a common software package or standard presents a barrier to conventional network solutions. In addition, any new process for the sharing of content has in the past generally required the user to adopt new workflow components, applications, and habits that tend to be disruptive to the user's normal day-to-day workflow routine, e.g., when working internal to their enterprise and with personal use. Simply using the Internet remains imperfectly secure for the sharing of confidential information.

Accordingly, there exists a need in the art for methods and systems for zero-knowledge enterprise collaboration.

SUMMARY OF THE INVENTION

Systems and methods for zero-knowledge enterprise collaboration are provided herein. In some embodiments, the method for zero-knowledge enterprise collaboration comprises receiving, at a host server, a request to store a file, wherein the file is encrypted with a data key prior to being received at the host server; receiving a request to perform a first service; determining whether the first service is authorized to access the file, wherein determining comprises unwrapping the data key a private key of the first service; providing access to the first service when the private key of the first service successfully unwraps the data key for the file; and storing the encrypted file.

In some embodiments, the method for accessing an encrypted file by a user of a user computer in a zero-knowledge enterprise collaboration, comprising: requesting an encrypted file from a host server; receiving the encrypted file and an encrypted key pair; deriving a key from a password of the user of the user computer to unwrap a private key of the user; decrypting a data key of the file using the private key of the user; and opening the file using the decrypted data key.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
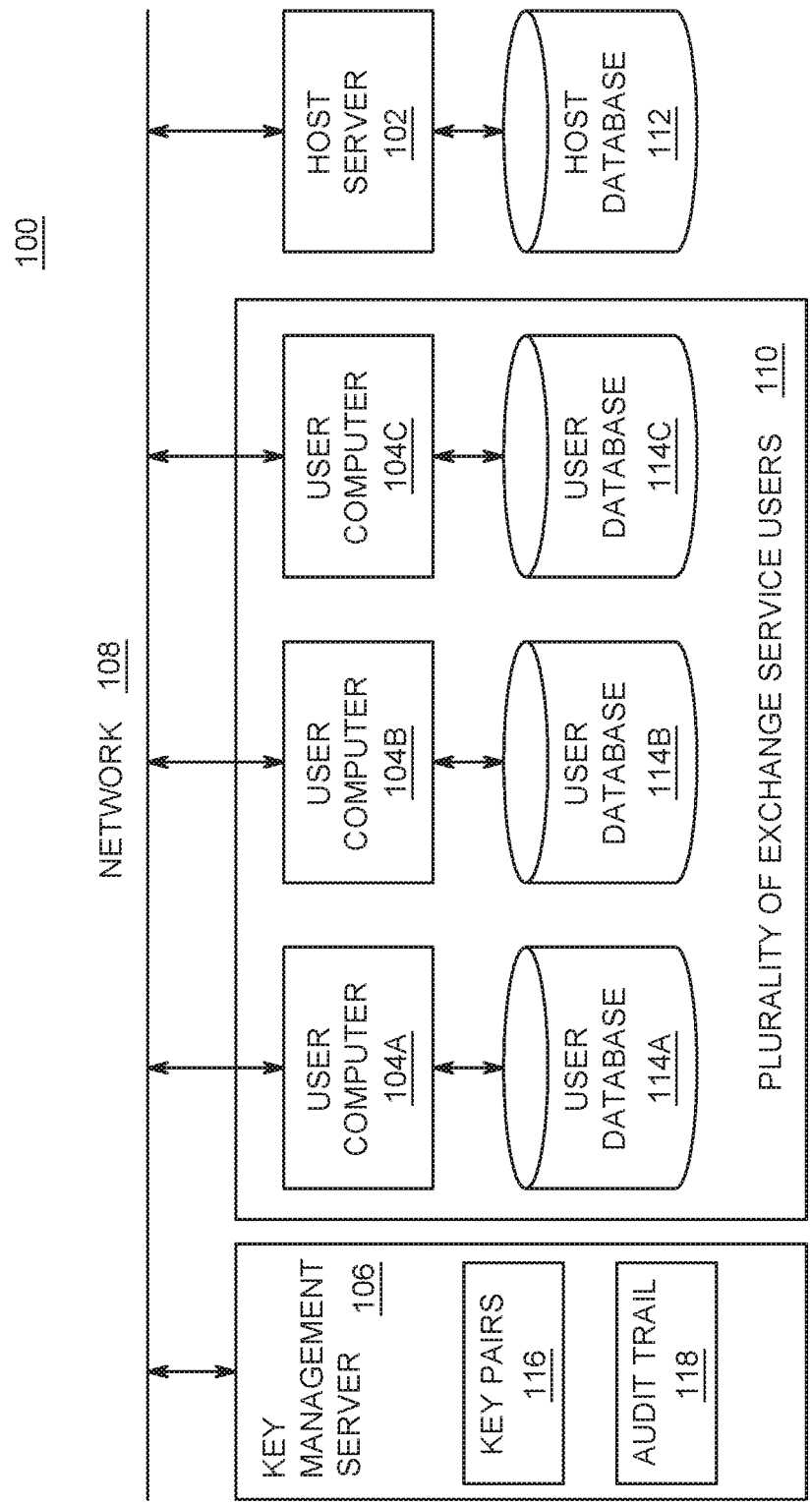
FIG. 1 is a block diagram of a system for system-to-system zero-knowledge enterprise collaboration in accordance with one or more embodiments of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments consistent with the present invention are directed to methods and systems for system-to-system zero-knowledge enterprise collaboration. At configuration time, a data owner (i.e., the enterprise) defines which systems of a third-party cloud storage service provider may access their data. The choices are cryptographically enforced by encrypting the data key by the public key of all authorized services. As an example, a search service and a virus scan service may be configured by the data owner to have access, but a translating service may not be configured to have access. When the file is received at the third-party cloud storage service provider, because the data key for the file is encrypted with the search service's public key, the search service uses its own private key to unwrap the data key, decrypt the file, and perform indexing of the file. The virus scan service uses the private key of the virus scan service to unlock the data key and perform a virus scan. The translation service however cannot access the file because the data owner did not configure access for the translation service (i.e., the data key was not encrypted with the public key of the translation service) and therefore, the private key of the translation service does not unlock the data key and can therefore not decrypt the file. When an authorized user attempts to read the file, the end user requests the file. The end user receives the encrypted file in addition to the key structure that includes the data key encrypted with their public key and their private key, said key structure encrypted by a key derived from the user's password. The user's password will be used to derive the key that unwraps the private key. The private key is used to unwrap the data key, and finally the data key is used to open the file. As such, although the file is stored on a server of a third-party cloud storage service provider, the service provider does not have cannot access the file unless a specific service of the service provider has been pre-configured to do so.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for system-to-system zero-knowledge enterprise collaboration in accordance with one or more embodiments of the invention. The system 100 includes a plurality of user computers 104A, 104B, 104C (collectively referred to user computers 104) communicatively coupled to host server 102 and key management server 106 via a network 108 (e.g. the Internet). A plurality of exchange service users 110 of an exchange service may exchange data, such as documents, messages, data, and the like, between a secure host server 102 and a plurality of user computers 104 across the network 108. In some embodiments, the host server 102 may only be accessed in a secure manner by authorized user computers 104 using an acceptable log-in procedure. Only authorized services on the host server 102 may access the enterprise data stored on the host server 102. Said services are authorized only if the service has been configured by the enterprise to have access. In some embodiments, the user computers 104 may interface with the network 108 through for example, a network server (not shown), and in association with an enterprise intranet, where a firewall is present between the user computers 104 and the network 108, and where the exchange is conducted between the user computers 104 and the host server 102 through a secure exchange across the network 108 and through the network server. In another embodiment, the user computers 104 may interact in the exchange with the host server 102 across the network 108 while away from or in the absence of the enterprise intranet and enterprise firewall. For instance, the user may be able to access the exchange while at home, such as using a mobile enterprise computer, a personally owned computer, a mobile device, and the like.

In some embodiments, the exchange host server 102 may be distributed over a plurality of server computers, and therefore host server 102 should be viewed as an illustrative example of one of such multiple servers. In this way, the server computers may work together to provide essentially seamless access to a large number of users on various platforms with varying communications speeds. The server computers may run under server management software which in turn may be responsible for coordination of services, maintaining state and system status, monitoring, security, and other administrative functions. In some embodiments, a user computer 104 having a suitable Web browser may directly access the host server 102.

In some embodiments, exchange services for different users may utilize separate software structured server databases 114A, 114B, and 114C. For example, company 'A' and company 'B' may use the same secure host server 102, but each company's data may be maintained in separate databases 114A and 114B, although perhaps in the same physical data storage facility. This feature offers the advantage of allowing the host server 102 to be customized for each company. For example, when the external user accesses the host server 102, the host server 102 may recognize the user and associate the user with a particular one of the companies A and B. Using this recognition, the host server 102 may present a customized browser interface which makes the host server 102 look like the selected company. To the external user, it may appear that they have been connected directly to a company server rather than the host server 102. Thus, the present invention may allow a user to securely send data such that the network connection is substantially transparent to the user. Further, the system 100 may provide customization of the remote host server 102 for each of a plurality of different users such that an external user accessing the remote server may appear to be connected to an internal client server.

The key management server 106 may manage and distribute keys for zero-knowledge enterprise collaboration. In some embodiments, the key management server 106 may reside at the enterprise's premises. In some embodiments, the key management server 106 may be remote from the enterprise's premises. Key management makes the enterprise data invisible to the services on the host server 102, except those services explicitly authorized and enforced by cryptography (i.e., public/private key pairs 116) as described in further detail below. An audit trail 118 is maintained by logging all services and users that have accessed the enterprise data or that have attempted access to the enterprise data. Due to the fact that the only way to access data is to decrypt the data using the key management server 106, the audit trail 118 serves as an accurate of access attempts without relying on a specific service's own auditing capabilities to track access.

In some embodiments, access to the exchange server by client processors may be through a host server 102 controlled by the business entity that controls the client processor. The user computers 104 may be at least one of owned and managed by at least one of the plurality of business entities. The user computers 104 may be owned by individual users. The host server 102 may be at least one of a plurality of exchange servers. The content may be at least one of a document, a spreadsheet, a message, data, an image, audio content, video content, multimedia content, and the like. The content may be transferred to the host server 102 via encrypted data transmission.

Figure 2:
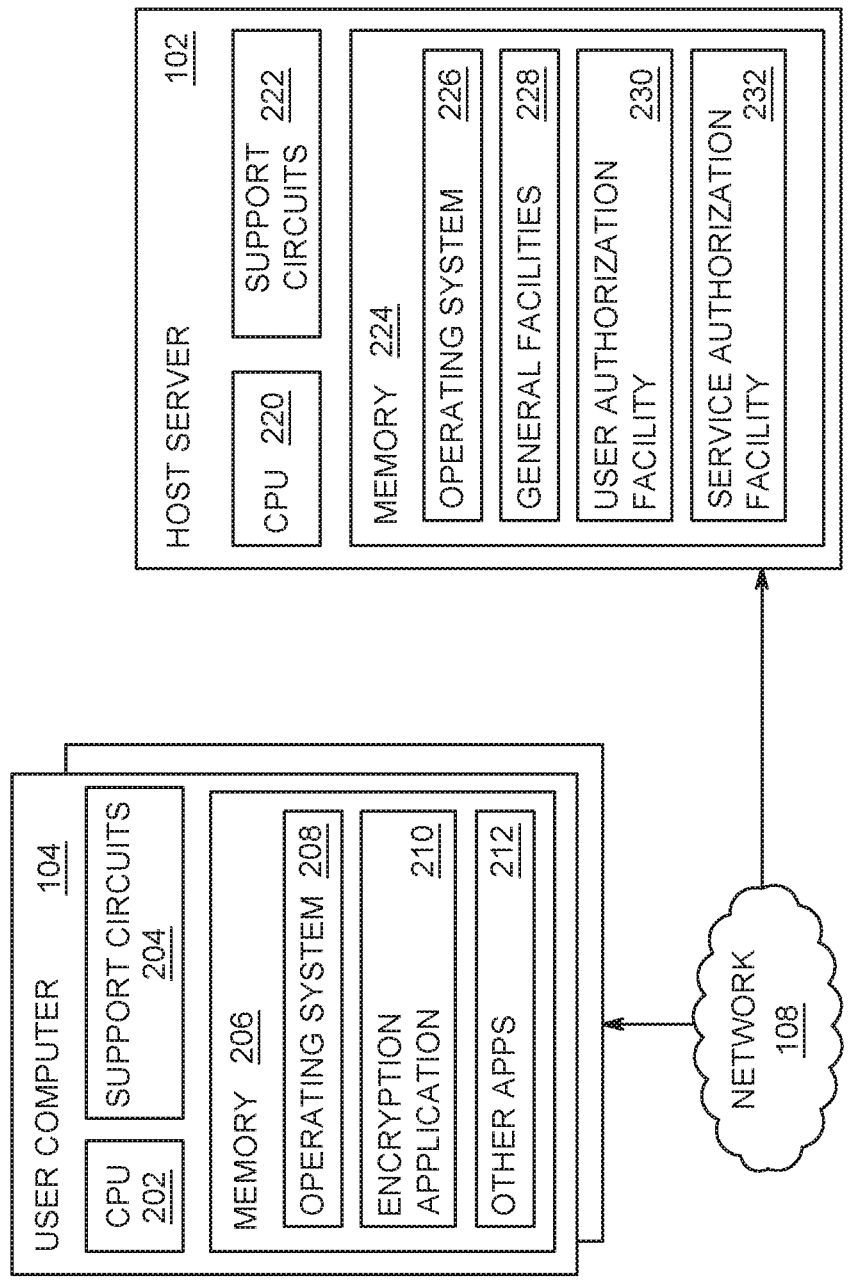
FIG. 2 is a more detailed block diagram of the system for zero-knowledge enterprise collaboration, in accordance with one or more embodiments of the invention.

FIG. 2 is a more detailed block diagram of the system 100 for zero-knowledge enterprise collaboration, in accordance with one or more embodiments of the invention. Each user computer 104 includes a Central Processing Unit (CPU) 202, support circuits 204 and a memory 206. The memory 206 includes an operating system 208 and an encryption application 210 that may be for example, a web browser or an installed application and one or more other apps 212 used perhaps for file creation, viewing, and the like.

Figure 6:
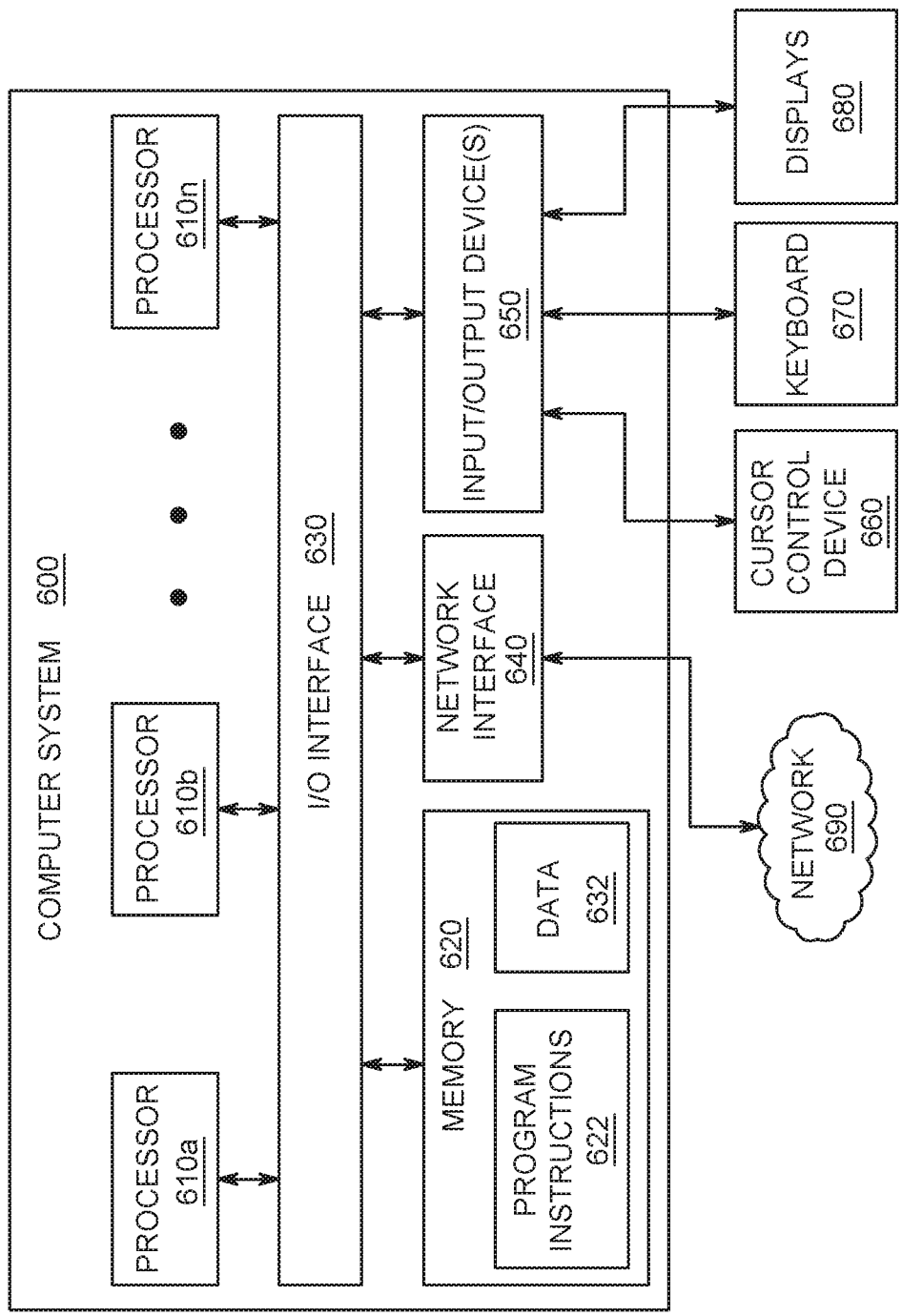
FIG. 6 is a depiction of a computer system that can be utilized in various embodiments of the present invention.

The host server 102 is a computing device, for example, a desktop computer, laptop, tablet computer, and the like, or it may be a cloud based server (e.g., a blade server, virtual machine, and the like). One example of a suitable computer is shown in FIG. 6, which is described in detail below. According to some embodiments, the host server 102 includes a Central Processing Unit (CPU) 220, support circuits 222 and a memory 224. The memory 224 includes an operating system 226, a plurality of general facilities 228 for typical processing, such as a community facility, a dashboard facility, a viewer facility, a distribution facility, a search facility, a translation facility, and a virus scan facility. In addition, the memory 224 includes a user authorization facility 230, and a service authorization facility 232. The CPU 220 may include one or more commercially available microprocessors or microcontrollers that facilitate data processing and storage. The various support circuits 222 facilitate the operation of the CPU 220 and include one or more clock circuits, power supplies, cache, input/output circuits, and the like. The memory 224 includes at least one of Read Only Memory (ROM), Random Access Memory (RAM), disk drive storage, optical storage, removable storage and/or the like.

The distribution facility may allow the host server 102 to electronically distribute data using secure communications among the plurality of users. The dashboard facility may provide companies to manage authorization for access to documents, contacts, communications, preferences, and the like.

The host server 102 may provide highly secure access control by way of the user authorization facility 230 that may allow only authorized personnel to access individual messages, documents, and communications. The service authorization facility 232 ensures only authorized services are performed on enterprise data, messages, documents, and the like. The viewer facility may be able to protect documents from unauthorized viewing, printing, saving, and the like.

A data owner (i.e., enterprise), at configuration time, defines which systems (i.e., services) in the host server 102 are authorized to access the data of the enterprise. The data owner encrypts the data key with the public key of the system. Each system has a private key that, if authorized, can unlock the data key of a file and decrypt the file. A key structure consisting of the data key encrypted by each authorized system is stored at the key management server 106 of FIG. 1. Although the key structure is described as residing in the key management server 106, since it is encrypted, the key structure may be stored remotely or at any location that is convenient for processing.

Before a user sends a file to be stored on the host server 102, the encryption application 210 encrypts the file with a data key. The encryption application 210 then encrypts the data key with the public keys of all authorized parties, including services and end users and stores the keys at the key management server 106 of FIG. 1. The encrypted file is then sent to the host server 102 for storage.

Upon receiving the encrypted file, the host server 102 performs services on the encrypted file. For example, the file may need to be indexed so it may be found during future searches of the enterprise data. In the present example, when the system was configured, the data owner authorized the search facility to access the enterprise data by encrypting the data key of the file with the public key of the search service. The service authorization facility 232 uses the private key of the search service to unwrap the data key, decrypt the file, and open the file. The indexing may then be performed on the file. Similar steps may be performed by the service authorization facility 232 if for example, the virus scan service attempts to run a virus scan on the file. However, if for example, the translation service attempts to access and translate the file, the service authorization facility 232 will not allow access. Due to the fact that the data owner did not encrypt the data key with the public key of the translation service, the data key cannot be unwrapped with the private key of the translation service, thereby denying access by the translation service.

Service authorization control is in contrast to user authorization. When a user attempts to access a stored file, the user sends a request to access the file. The encrypted file as well as a key pair consisting of the data key encrypted with the user's public key plus the user's private key. The key pair is encrypted with a key derived from the user's password (or other user authentication credentials). The user's password is used to derive the key that unlocks the key pair. The user's private key is then used to unwrap the data key and the data key is used to open the file. The viewer facility may be used to display the file to the user. As such, only authorized services and user may access a file stored on the host server.

Figure 3:
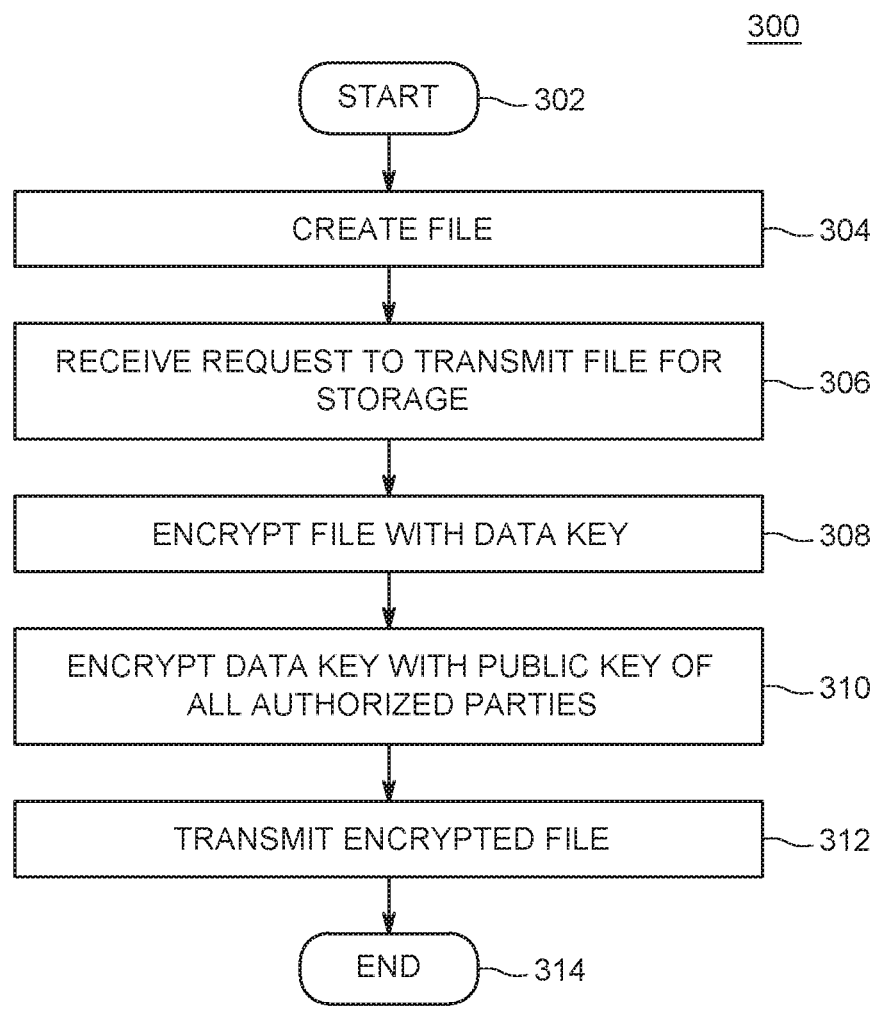
FIG. 3 depicts a flow diagram of a method for creating a file using zero-knowledge enterprise collaboration, in accordance with one or more embodiments of the invention.

FIG. 3 depicts a flow diagram of a method 300 for creating a file using zero-knowledge enterprise collaboration, in accordance with one or more embodiments of the invention. The method 300 is performed on a user computer device. The method 300 starts at step 302 and proceeds to step 304.

At step 304, a file is created. A user creates a file, for example a document, an image, a video, an audio file, or any data using an appropriate application for the user's needs.

At step 306, a request is received to transmit the file to a host server for storage.

At step 308, the file is encrypted with a data key. The data key is generated using an encryption application on the user device that is receiving the request to transmit the file. The data key is unique to the file. The data key is used to encrypt the file.

At step 310, the data key is encrypted with the public key of all authorized parties. The authorized parties may include services that may be performed by the host server where the file is stored. The authorized parties may also include any authorized users. The data keys encrypted with the public keys may be stored at a key management server.

At step 312, the file is transmitted to the host server for storage. The method 300 ends at 314.

Figure 4:
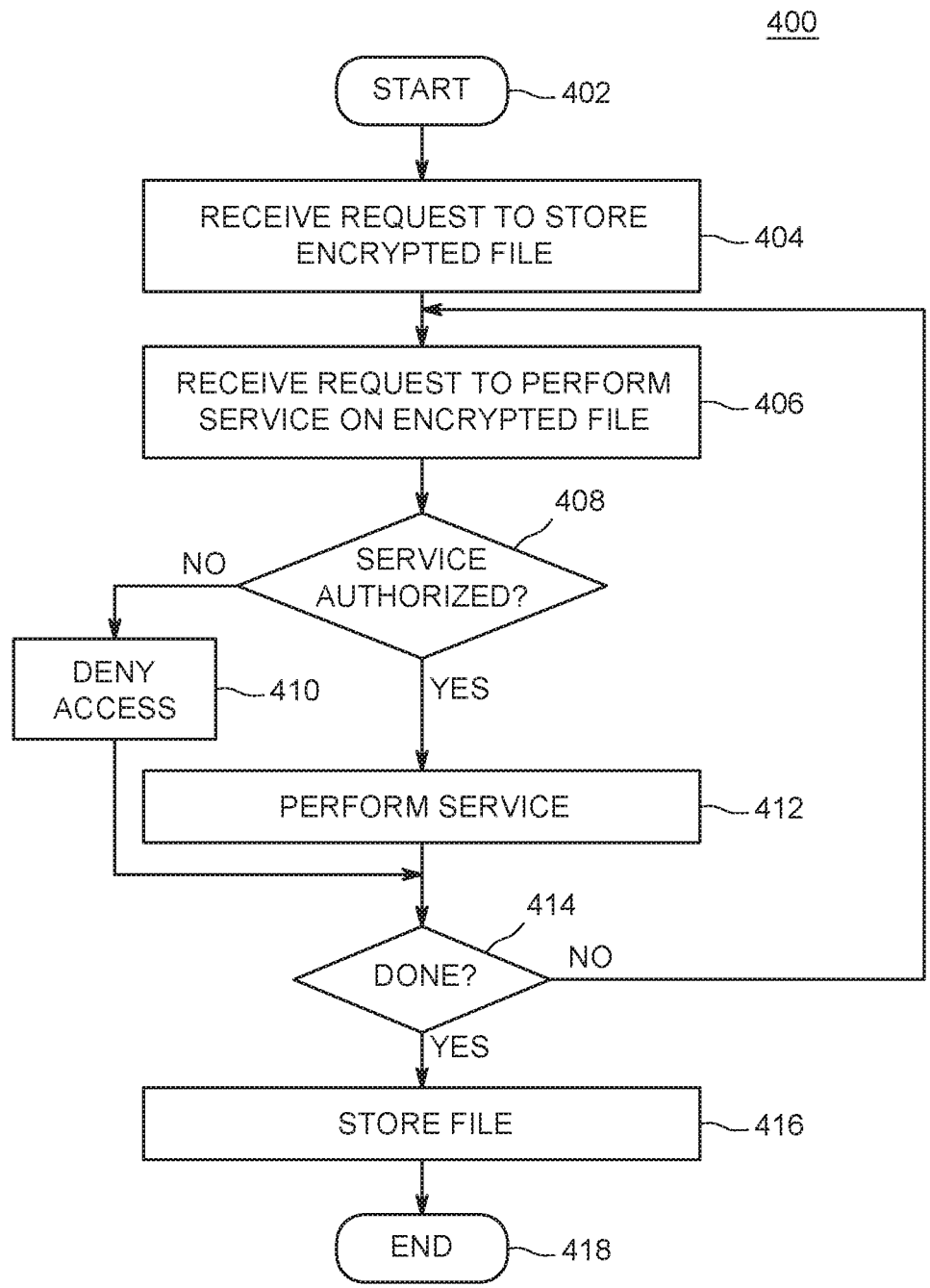
FIG. 4 depicts a flow diagram of a method for accessing zero-knowledge enterprise collaboration data by a service of the host server, in accordance with one or more embodiments of the invention.

FIG. 4 depicts a flow diagram of a method 400 for accessing zero-knowledge enterprise collaboration data by a service of the host server, in accordance with one or more embodiments of the invention. The method 400 is performed on a host server where the secure data is stored. The method 400 starts at step 402 and proceeds to step 404.

At step 404, an encrypted file is received with a request to store the file. The file is encrypted with a data key and the data key is also encrypted. As such, the host server cannot view the data. However, one or more services on the host server may be authorized to view the data for various reasons.

At step 406, a request is received to perform a service on the encrypted file. For example, the service may be from a search service on the host server that indexes the file so it may be retrieved with future searches. The service may be a virus scan service that insures that no viruses are in the encrypted file. The service may be a translation service that translates the file into another language.

At step 408, it is determined whether the requested service is authorized to perform said service on the file. The data owner (i.e., enterprise), at the time of configuring the system, decided which systems/services would have access to their data. For example, the data owner may have authorized the virus scan service and the search service to access their data, but did not authorized the translation service to access their files. In the present example, the search service uses its private key to unlock the data key of the file. If the private key of the search service unlocks the data key, then at step 412, the search service performs the service of indexing the file and the method 400 proceeds to step 414.

However, if at step 408, the search service was not authorized to access the file and the private key of the search service failed to unlock the data key, the method 400 proceeds to step 410, where the service is denied access and the method 400 proceeds to step 414.

At step 414, it is determined whether any additional services are attempting to access the encrypted file. If additional services are attempt to access the file then the method 400 proceeds to step 406 where a request is received to perform a service and the method iterates until at step 414 no additional services attempt to perform a service on the file and the method proceeds to step 416, where the file is securely stored at the host server. The method ends at step 418.

Figure 5:
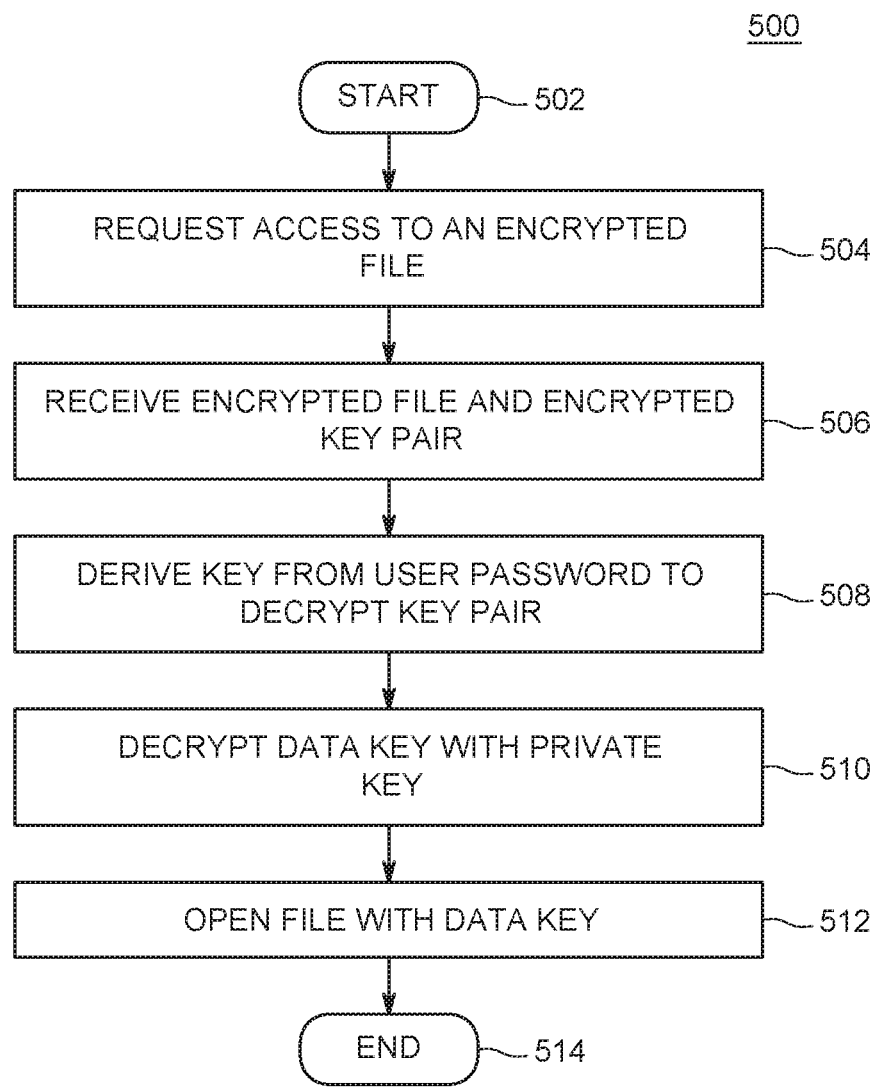
FIG. 5 depicts a flow diagram of a method for accessing zero-knowledge enterprise collaboration data by a user, in accordance with one or more embodiments of the invention.

FIG. 5 depicts a flow diagram of a method 500 for accessing zero-knowledge enterprise collaboration data by a user, in accordance with one or more embodiments of the invention. The method 500 is performed on a user computer. The method 500 starts at step 502 and proceeds to step 504.

At step 504, a request is sent to a host server to access a secure encrypted file, for example a file created using the method 300 and stored using the method 400.

At step 506, the encrypted file is received in addition to an encrypted key pair. The key pair includes the data key encrypted with the user's public key as well as their private key. The key pair was encrypted by a key derived from the user's password.

At step 508, the key from the user's password is derived and used to unwrap the private key of the user. At step 510, the private key is used to unwrap the data key. At step 512, the data key is used to open the file. The method 500 ends at step 514.

The embodiments of the present invention may be embodied as methods, apparatus, electronic devices, and/or computer program products. Accordingly, the embodiments of the present invention may be embodied in hardware and/or in software (including firmware, resident software, microcode, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk, C#, or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

FIG. 6 depicts a computer system 600 that can be utilized in various embodiments of the present invention to implement the computer and/or the display, according to one or more embodiments.

Various embodiments of method and apparatus for zero-knowledge enterprise collaboration, as described herein, may be executed on one or more computer systems, which may interact with various other devices. One such computer system is computer system 600 illustrated by FIG. 6, which may in various embodiments implement any of the elements or functionality illustrated in FIGS. 1-5. In various embodiments, computer system 600 may be configured to implement methods described above. The computer system 600 may be used to implement any other system, device, element, functionality or method of the above-described embodiments. In the illustrated embodiments, computer system 600 may be configured to implement the methods 300, 400, and 500 as processor-executable executable program instructions 622 (e.g., program instructions executable by processor(s) 610) in various embodiments.

In the illustrated embodiment, computer system 600 includes one or more processors 610a-610n coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In various embodiments, any of the components may be utilized by the system to receive user input described above. In various embodiments, a user interface may be generated and displayed on display 680. In some cases, it is contemplated that embodiments may be implemented using a single instance of computer system 600, while in other embodiments multiple such systems, or multiple nodes making up computer system 600, may be configured to host different portions or instances of various embodiments. For example, in one embodiment some elements may be implemented via one or more nodes of computer system 600 that are distinct from those nodes implementing other elements. In another example, multiple nodes may implement computer system 600 in a distributed manner.

In different embodiments, computer system 600 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs). In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 620. In other embodiments, program instructions and/or data may be received, sent or stored upon different types of computer-accessible media or on similar media separate from system memory 620 or computer system 600.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., network 690), such as one or more external systems or between nodes of computer system 600. In various embodiments, network 690 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In some embodiments, the illustrated computer system may implement any of the operations and methods described above, such as the methods illustrated by the flowchart of FIGS. 3-5. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer-implemented method for accessing an encrypted file by a user of a user computer in a zero-knowledge enterprise collaboration, comprising:
  requesting an encrypted file from a host server;
  receiving the encrypted file and an encrypted key pair, wherein the encrypted key pair comprises an encrypted data key and a private key of the user;
  deriving a key from a password of the user of the user computer to unwrap the encrypted key pair;
  decrypting a data key of the file using the private key of the user; and
  opening the file using the decrypted data key.

2. The method of claim 1, wherein the encrypted file is encrypted with a data key, and wherein the data key is encrypted with a public key of the user.

3. The method of claim 1, wherein the key pair comprises the data key for the file encrypted with a public key of the user, and the private key of the user.

4. A system for zero-knowledge enterprise collaboration, comprising:
  a plurality of encrypted files stored on a host server, the host server comprising:
    a) at least one processor;
    b) at least one input device; and
    c) at least one storage device storing processor executable instructions which, when executed by the at least one processor, perform a method to:
    receive, at the host server, a request to store a file, wherein the file is encrypted with a data key prior to being received at the host server;
    receive a request to perform a first service;
    determine whether the first service is authorized to access the file, wherein determining comprises unwrapping the data key with a private key of the first service;
    provide access to the first service when the private key of the first service successfully unwraps the data key for the file; and
    store the encrypted file; and
  a plurality of user computers, each user computer comprising:
    a) at least one processor;
    b) at least one input device; and
    c) at least one storage device storing processor executable instructions which, when executed by the at least one processor, perform a method to:
    request the encrypted file from a host server;
    receive the encrypted file and an encrypted key pair, wherein the encrypted key pair comprises the encrypted data key and the private key of the user;
    derive a key from a password of the user of the user computer to unwrap the encrypted key pair;
    decrypt a data key of the file using the private key of the user; and
    open the file using the decrypted data key.

5. The method of claim 4, wherein the encrypted file is encrypted with a data key, and wherein the data key is encrypted with a public key of the user.

6. The method of claim 4, wherein the encrypted key pair comprises the data key for the file encrypted with a public key of the user, and the private key of the user.

7. The system of claim 4, wherein the processor executable instructions which, when executed by the at least one processor, perform the method further comprising:
  receive a request to perform a second service;
  determine whether the second service is authorized to access the file, wherein determining comprises unwrapping the data key with the private key of the second service; and
  deny access to the second service when the private key of the second service fails to unwrap the data key for the file.

8. The method of claim 4, wherein the data key is encrypted using a public key of each of one or more services on the host server that are authorized to access the file.

* * * * *